Jan. 9, 1951     E. P. NEHER     2,537,847
COUPLING
Filed Oct. 17, 1945

INVENTOR.
Eldon Paul Neher
BY
Evans + McCoy
ATTORNEYS

Patented Jan. 9, 1951

2,537,847

UNITED STATES PATENT OFFICE

2,537,847

COUPLING

Eldon Paul Neher, North Manchester, Ind., assignor to The General Tire & Rubber Company, Akron, Ohio, a corporation of Ohio Application October 17, 1945, Serial No. 622,857

7 Claims. (Cl. 64—14)

This invention relates to a vibration-absorbing device; it particularly relates to a vibration-absorbing device suitable for coupling two relatively rotatable members, such as a driven member and a driving member.

It is an object of the present invention to provide a coupling for connecting driven and driving members which is of relatively low cost, permits misalignment of the shaft and tends to isolate torsional vibrations.

It is another object of the present invention to provide a relatively low cost antivibration device capable of absorbing torsional vibrations between two members connected through said device.

It is another object of the present invention to provide a coupling between a driven member and a driving member which is capable of withstanding thrusts and yet permitting longitudinal movement between said relatively rotatable members.

It is a further object of the present invention to provide a coupling member for connecting a driving member to a driven member which combines the effect of rubber under tension and compression with a damping action on frictional movement between rubber and a rigid surface.

Other objects will be apparent from the following description of the invention as illustrated by the accompanying drawing, in which.

Figure 1:
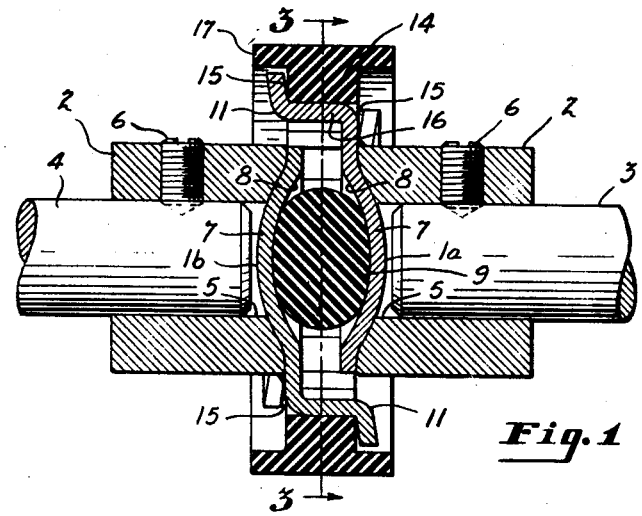
Figure 1 is a longitudinal sectional view through a coupling device embodying the present invention, showing a portion of a driven member and of a driving member connected through said coupling.
Figure 2:
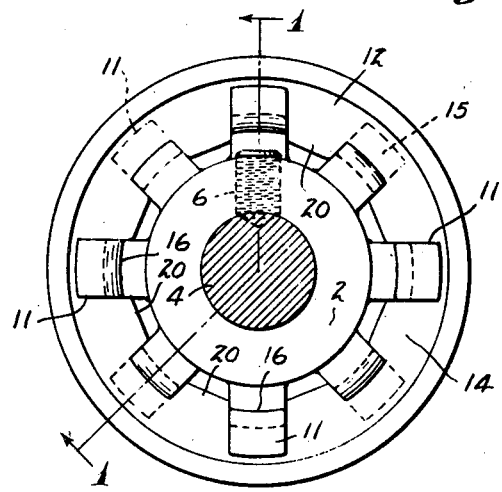
Fig. 2 is an end elevational view of the vibration-absorbing device of Fig. 1.
Figure 3:
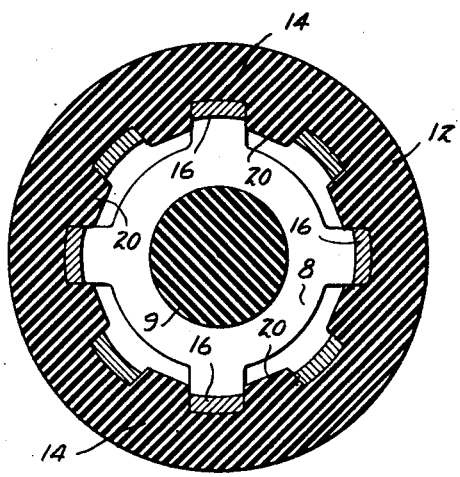
Fig. 3 is a sectional view on the line 3—3 of Fig. 1.
Figure 4:
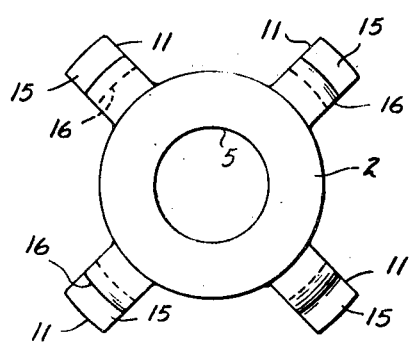
Fig. 4 is an end elevational view of one of the rigid connecting members of the mounting illustrated in Figs. 1 to 3.

The couplings or torsional vibration-insulating devices of the present invention utilize a resilient thrust-cushioning member, a block, preferably a ball, of vulcanized rubberlike or resilient material which may be solid or hollow. This block of material has disposed on each of two opposite portions thereof a rigid connecting member with a relatively wide rigid surface bearing against said block. Each of the two rigid connecting members carries attaching means for attachment to the driven or driving members, as desired, and a plurality of spaced fingers, which preferably extend outwardly and forwardly to a peripheral diameter substantially larger than that of the bearing surface. The fingers of each of the rigid connecting members are arranged in interfingering relation with the fingers of the other rigid connecting member. Resilient interlocking means, which may be an annulus of resilient material, is provided to cooperate with the fingers and form a resilient external interlock that retains the bearing surface of a rigid member against each of the opposite sides of the resilient thrust-cushioning member.

The resilient interlocking member is an important feature in the operation of the coupling as it is a main torque-transmitting member while permitting some vibrational movement in any direction between the members. The central resilient thrust-cushioning member which is usually a block of resilient material, in cooperation with the rigid surfaces not only facilitates the retention of the coupling in a unit but substantially increases the damping characteristics of the coupling both as to torsional and lateral movements. It also, like the resilient interlocking means or annulus of resilient material, functions to sustain thrusts in one of the axial directions. The relatively wide thrust-receiving or bearing surface is preferably of greater area than the projected area of the block thereon, so that the deflection characteristics of the coupling are subject to relatively greater change as the degree of thrust is increased.

Referring more particularly to the drawings, wherein like parts are indicated by like numerals of reference throughout the several views, my improved torsional vibration-absorbing units or couplings have, as aforesaid, two rigid connecting members *1a* and *1b*, each having a platelike thrust-receiving portion 7 carrying on one side thereof connecting means for making rigid connection with one of said rotatable members and having on the other side thereof a rigid thrust-receiving surface 8 which is preferably concave and which is disposed generally perpendicular to the axis of the rotatable member to which the particular rigid connector is to be rigidly attached. The attaching means may be a tubular portion 2 for making suitable connection to one of two rotatable members, such as a driven shaft 3 and a driving shaft 4. Each of the tubular portions 2 receives within a bore 5 thereof an end portion of one of the driving or driven shafts and is held in rigid relation thereto by suitable means, such as one of the set screws 6. The central portion of the rigid thrust-receiving surface generally intersects the axis of the tubular portion 2.

A resilient thrust-cushioning member such as a ball or block 9 or rubberlike vulcanized material, which may be a vulcanized natural or synthetic rubber compound having resilience or flexibility generally characteristic of soft rubberlike compounds, is centrally disposed between the rigid thrust-receiving surfaces of the rigid connecting members 1a and 1b so that each of the opposite sides thereof contact or bear against the thrust-receiving surface 8 of one of the rigid members. The rigid thrust-cushioning member 9 therefore prevents the rigid thrust-receiving surfaces of the two rigid connecting members from being forced into metal-to-metal contact with each other but permits resilient longitudinal movement between the driven and driving shafts 3 and 4, respectively.

The radius of curvature of the thrust-receiving surfaces 8 is preferably substantially larger than the normal radius of curvature of the surfaces of the ball 9 which in some instances, where there is a lateral offset between the axis of the driven and driving members, is sometimes preferably hollow. The ball is usually solid, however.

The rigid connecting members 1a and 1b, as aforementioned, each also carry a plurality of angularly spaced fingers or flanged members 11. The fingers or flanged members 11 are connected by members 1a and 1b and preferably extend outwardly in a generally radial direction and forwardly of the surface 8 of the platelike thrust-receiving portion 7 to which they are preferably directly attached. The fingers carried by each of the rigid connecting members 1a and 1b are arranged in interfingering relationship with the fingers carried by the other connecting members. A resilient interlocking member, which may be a rubber annulus 12, cooperates with the fingers to prevent separation of those carried by one rigid member from those carried by the other rigid member without distortion of the rubber annulus.

The rubber annulus 12 is preferably of generally T-shaped cross section, as shown in Figure 1, having a body portion 14 and axially extending portions 17. The body portion 14 is preferably adapted to substantially fit the groove defined on its two opposite sides by the outwardly or generally laterally extending planar surfaces 15 of the two sets of fingers 11 and on the bottom by the axially extending portions 16 of the fingers. The axially extending peripheral portions 17 are disposed adjacent to side edges of the body 14 and overlie the peripheral ends of the fingers 11.

Means such as one or more lugs or projections 20 of resilient material, which extend between adjacent fingers 11 are provided to prevent a portion of a finger 11 carried by the member 1a from making metal-to-metal contact with a portion of a finger 11 carried by the rigid connecting member 1b when the members 1a and 1b are subjected to a relatively angular stress, such as a stress tending to cause relative axial movement about the axis of the driven and driving shafts 3 and 4, respectively. The resilient projections are preferably carried by the resilient annulus 12 and preferably extend inwardly from the body portion thereof between adjacent fingers, as shown, to form a toothlike inner peripheral portion of the annulus.

The proportions of the component parts of the torque-transmitting devices of the present invention are preferably selected to provide a small amount of compression on the resilient thrust-cushioning member 9 when the coupling is in the normal state, i. e. unconnected to any driven or driving members. Thus, the height or axial thickness of the body portion 14 of the annulus 12, the thickness of the ball 9 and the distances between the laterally extending surfaces 15 of the fingers 11 are preferably proportioned to provide a slight compression in the ball 9 when the coupling is in the free state.

In the operation of couplings of the present invention, the thrust-cushioning member or ball 9, which may or may not be bonded to a central portion of the surface 8, permits relative axial movement as well as lateral movement of the rigid connectors 1a and 1b. The movement of the ball 9 when the rigid members are connected to shafts whose axes are displaced laterally from each other is of a rolling nature, even though the central portion is bonded to the surface. This permits relatively low resistance to misalignment and gives relatively small heat build-up within the interior thereof.

The major portion of the torque is transmitted through portions of the annulus 12, a large share being transmitted by compression through the lugs 20 between adjacent fingers of the two rigid connecting members.

The damping action that reduces tendency for undesirable hunting between the driven and driving members is accomplished by frictional absorption of energy, by relative movement between the fingers 11 and the annulus 12, and by frictional dissipation of energy by relative movement between the thrust-cushioning member 9 and the surfaces 8.

It is to be understood that variations and modifications of the specific devices herein shown and described for purposes of illustration may be made without departing from the spirit of the invention.

What I claim is:

1. A coupling for making connection between two rotatable members comprising two rigid connecting members, each adapted to be carried by one of said rotatable members, said rigid connecting members having a platelike thrust-receiving portion carrying on one side thereof connecting means for making rigid connection with one of said rotatable members and having on the other side thereof a rigid concave thrust-receiving surface disposed generally perpendicular to the axis of the rotatable member to which the thrust-receiving member is to be rigidly attached and having the center thereof substantially on said axis, the rigid thrust receiving surfaces of each of said rigid connecting members being spaced from and directed toward each other, a resilient thrust-cushioning member disposed between the thrust-receiving surfaces of said rigid connecting members with one side of said cushioning member bearing against one of said thrust-receiving surfaces and an opposite side bearing against the other of said thrust-receiving surfaces, each of said rigid connecting members carrying a plurality of angularly spaced flanged portions, the flanged portions carried by one of said rigid connecting members being arranged in interfingering relationship with the flanged portions carried by the other of said rigid connecting members, and an annular, separately formed resilient locking member having portions carried between flanged portions attached to the two rigid connecting members, said locking member being freely removable from said flange portions, whereby substantial relative axial movement of said rigid connecting members may be had only through distortion of at least one of said resilient members and whereby torque is transmitted from one of said rigid connecting members to the other of said rigid connecting members through said resilient locking member.

2. A coupling for making connection between two rotatable members comprising two rigid connecting members, each adapted to be carried by one of said rotatable members, said rigid connecting members having a platelike thrust-receiving portion carrying on one side thereof connecting means for making rigid connection with one of said rotatable members and having on the other side thereof a rigid thrust-receiving surface disposed generally perpendicular to the axis of the rotatable member to which the thrust-receiving member is to be rigidly attached and having the center thereof substantially on said axis, the rigid thrust receiving surfaces of each of said rigid connecting members being spaced from and directed toward each other, a resilient thrust-cushioning member disposed between the thrust-receiving surfaces of said rigid connecting members with one side of said cushioning member bearing against one of said thrust-receiving surfaces and an opposite side bearing against the other of said thrust-receiving surfaces, each of said rigid connecting members carrying a plurality of angularly spaced flanged portions, the flanged portions carried by one of said rigid connecting members being arranged in interfingering relationship with the flanged portions carried by the other of said rigid connecting members, said flanged portions cooperatively forming an annular, generally channel-shaped, circumferentially open groove, and an annular, resilient locking member having portions carried in said groove formed by and between flanged portions attached to the two rigid connecting members, whereby substantial relative axial movement of said rigid connecting members may be had only through distortion of at least one of said resilient members and whereby torque is transmitted from one of said rigid connecting members to the other of said rigid connecting members through said resilient locking member.

3. A coupling device for making driving connection between a driven shaft and a driving shaft comprising two rigid connecting members, each of said rigid connecting members comprising a tubular portion adapted to receive one of said shafts, a platelike thrust-receiving member carried by said tubular portion at one end thereof and extending generally perpendicular to the axis thereof, said thrust-receiving member having a thrust-receiving surface disposed with an effective center thereof substantially at the axis of said tubular portion and carrying a pluraltiy of spaced fingers, a resilient thrust-cushioning member disposed between the thrust-receiving surfaces of said rigid connecting members and preventing metal-to-metal contact by axial movement of said rigid members without substantial deformation of said thrust-cushioning member, said fingers of one of said rigid connecting members being arranged in interfingering relationship with fingers carried by the other of said rigid connecting members, a separately cured resilient annulus carried by said fingers and connecting the two sets of fingers so that they cannot be separated without distorting said annulus, said annulus being free of surface adhesion to said fingers, and a resilient projection carried by said annulus extending between a finger carried by one of said rigid connecting members and a finger carried by another of said rigid connecting members to prevent a portion of a finger carried by one of said connecting members from making metal-to-metal contact with a portion of a finger carried by the other connecting member when said rigid connecting members are subjected to torque, tending to cause relative angular movement thereof.

4. A coupling device for making driving connection between a driven shaft and a driving shaft comprising two rigid connecting members, each of said rigid connecting members comprising a tubular portion adapted to receive one of said shafts, a platelike thrust-receiving member carried by said tubular portion at one end thereof and extending generally perpendicular to the axis thereof, said thrust-receiving member having a thrust-receiving surface disposed with an effective center thereof substantially at the axis of said tubular portion and carrying a plurality of spaced fingers, a resilient thrust-cushioning member disposed between the thrust-receiving surfaces of said rigid connecting members and preventing metal-to-metal contact by axial movement of said rigid members without substantial deformation of said thrust-cushioning member, said fingers of one of said rigid connecting members being arranged in interfingering relationship with fingers carried by the other of said rigid connecting members, a separable resilient annulus carried by said fingers and connecting the two sets of fingers so that they canont be separated without distorting said annulus, said annulus being free of surface adhesion between it and portions of said fingers, and resilient means carried by said fingers for preventing a portion of a finger carried by one of said connecting members from making metal-to-metal contact with a portion of a finger carried by the other connecting member when said rigid connecting members are subjected to torque, tending to cause relative angular movement thereof.

5. A coupling device for making driving connection between a driven shaft and a driving shaft comprising two rigid connecting members, each of said rigid connecting members comprising a tubular portion adapted to receive one of said shafts, a platelike thrust-receiving member carried by said tubular portion at one end thereof and extending generally perpendicular to the axis thereof, said thrust-receiving member having a thrust-receiving surface disposed with an effective center thereof substantially at the axis of said tubular portion and carrying a plurality of spaced fingers, a ball of rubberlike material disposed between the thrust-receiving surfaces of said rigid connecting members and preventing metal-to-metal contact by axial movement of said rigid members without substantial deformation of said thrust-cushioning member, said fingers of one of said rigid connecting members being arranged in interfingering relationship with fingers carried by the other of said rigid connecting members to form a channel-shaped groove open at its outer circumference, a separately molded, removable resilient annulus carried by said fingers and connecting the two sets of fingers so that they cannot be separated without distorting said annulus, and a resilient projection extending between a finger carried by one of said rigid connecting members and a finger carried by another of said rigid connecting members to prevent a portion of a finger carried by one of said connecting members from making metal-to-metal contact with a portion of a finger carried by the other connecting member when said rigid connecting members are subjected to torque, tending to cause relative angular movement thereof.

6. A coupling device for making driving connection between a driven shaft and a driving shaft comprising two rigid connecting members, each of said rigid connecting members comprising a tubular portion adapted to receive one of said shafts, a platelike thrust-receiving member carried by said tubular portion at one end thereof and extending generally perpendicular to the axis thereof, said thrust-receiving member having a thrust-receiving surface disposed with an effective center thereof substantially at the axis of said tubular portion and carrying a plurality of spaced fingers, extending outwardly and axially of said thrust-receiving surfaces, a resilient thrust-cushioning member disposed between the thrust-receiving surfaces of said rigid connecting members and preventing metal-to-metal contact by axial movement of said rigid members without substantial deformation of said thrust-cushioning member, said fingers of one of said rigid connecting members being arranged in interfingering relationship with fingers carried by the other of said rigid connecting members to form a circumferential groove having each side wall formed from fingers carried by but one of said thrust-receiving surfaces and a bottom formed of fingers carried by both of said thrust-receiving members, a resilient annulus carried by said fingers and having portions within said groove and connecting the two sets of fingers so that they cannot be separated without distorting said annulus, and a resilient projection extending between a finger carried by one of said rigid connecting members and a finger carried by another of said rigid connecting members to prevent a portion of a finger carried by one of said connecting members from making metal-to-metal contact with a portion of a finger carried by the other connecting member when said rigid connecting members are subjected to torque, tending to cause relative angular movement thereof.

7. A coupling device for making driving connection between a driven shaft and a driving shaft comprising two rigid connecting members, each of said rigid connecting members comprising a tubular portion adapted to receive one of said shafts, a platelike thrust-receiving member carried by said tubular portion at one end thereof and extending generally perpendicular to the axis thereof, said thrust-receiving member having a thrust-receiving surface disposed with an effective center thereof substantially at the axis of said tubular portion and carrying a plurality of spaced fingers extending outwardly and axially of said thrust-receiving surfaces, a ball of rubberlike material disposed between the thrust-receiving surfaces of said rigid connecting members and preventing metal-to-metal contact by axial movement of said rigid members without substantial deformation of said thrust-cushioning member, said fingers of one of said rigid connecting members being arranged in interfingering relationship with fingers carried by the other of said rigid connecting members, a separately molded, removable, resilient annulus carried by said fingers and connecting the two sets of fingers so that they cannot be separated without distorting said annulus, and a plurality of inwardly projecting resilient lugs carried by said annulus and extending between said fingers to prevent a portion of a finger carried by one of said connecting members from making metal-to-metal contact with a portion of a finger carried by the other connecting member when said rigid connecting members are subjected to torque, tending to cause relative angular movement thereof.

ELDON PAUL NEHER.

REFERENCES CITED

The following references are of record in the file of this patent:

UNITED STATES PATENTS

| Number | Name | Date |
|---|---|---|
| 2,125,559 | Hamill | Aug. 2, 1938 |

FOREIGN PATENTS

| Number | Country | Date |
|---|---|---|
| 486,917 | Great Britain | of 1938 |